United States Patent [19]

Bush et al.

[11] Patent Number: 5,126,528
[45] Date of Patent: Jun. 30, 1992

[54] RESISTANCE WELDING ELECTRODE HAVING AN ANGLED NOSE AND PROCESS OF FABRICATION THEREOF

[75] Inventors: Arden W. Bush, Trafalger; Everett E. Shirley, Lebanon, both of Ind.

[73] Assignee: CMW, Inc., Indianapolis, Ind.

[21] Appl. No.: 528,945

[22] Filed: May 25, 1990

Related U.S. Application Data

[63] Continuation-in-part of Ser. No. 410,823, Sep. 26, 1989, Pat. No. 5,015,816, which is a continuation-in-part of Ser. No. 260,196, Oct. 20, 1988, Pat. No. 4,954,687.

[51] Int. Cl.$^5$ .............................................. B23K 35/02
[52] U.S. Cl. ................................................... 219/119
[58] Field of Search ................................. 219/119, 120

[56] References Cited

U.S. PATENT DOCUMENTS 4,954,687 9/1990 Bush et al. ........................... 219/119

Primary Examiner—Clifford C. Shaw
Attorney, Agent, or Firm—Woodard, Emhardt, Naughton, Moriarty & McNett

[57] ABSTRACT

Resistance welding electrodes and processes of using and of fabricating the same are provided. The electrodes have a base portion and an integral nose portion projecting therefrom, with the nose portion terminating in a welding tip face. The nose portion tapers inwardly between said base portion and said welding tip face with a concave profile taper such as a frustum of a vortical surface. The electrodes used may be made up of a conventional copper material having copper combined with one or more metals selected from the group consisting of chromium, zirconium, cadmium, cobalt, nickel, beryllium, tungsten, aluminum, tungsten carbide, iron, and molybdenum; or, may be made of essentially pure copper. The electrodes may be used in a welding process, which provides for a generally linear increase in current stepping with reduced or eliminated conditioning of the electrodes. The welding tip face has a convex curvature which may range between about a two inch and a eight inch radius of curvature, and which preferably has a radius of curvature of about four inches. Both male and female electrodes may be used with cooling recesses in the electrodes as well as an offset nose portion. The diameter of the welding tip face may be about equal to the length of the nose portion. The nose portion may be angled with respect to the base, and additionally may be offset. Fibrous grain structure may be formed which is at a non-normal angle with respect to the welding tip face to reduce cracking.

25 Claims, 10 Drawing Sheets

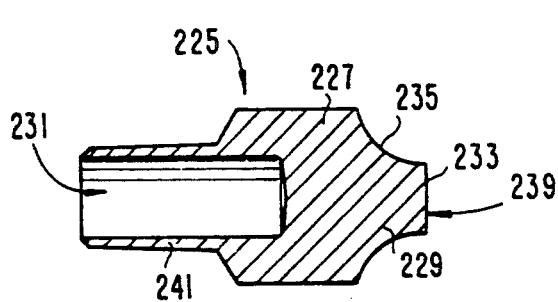
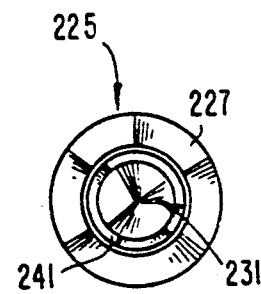
Fig.2D  Fig.2C
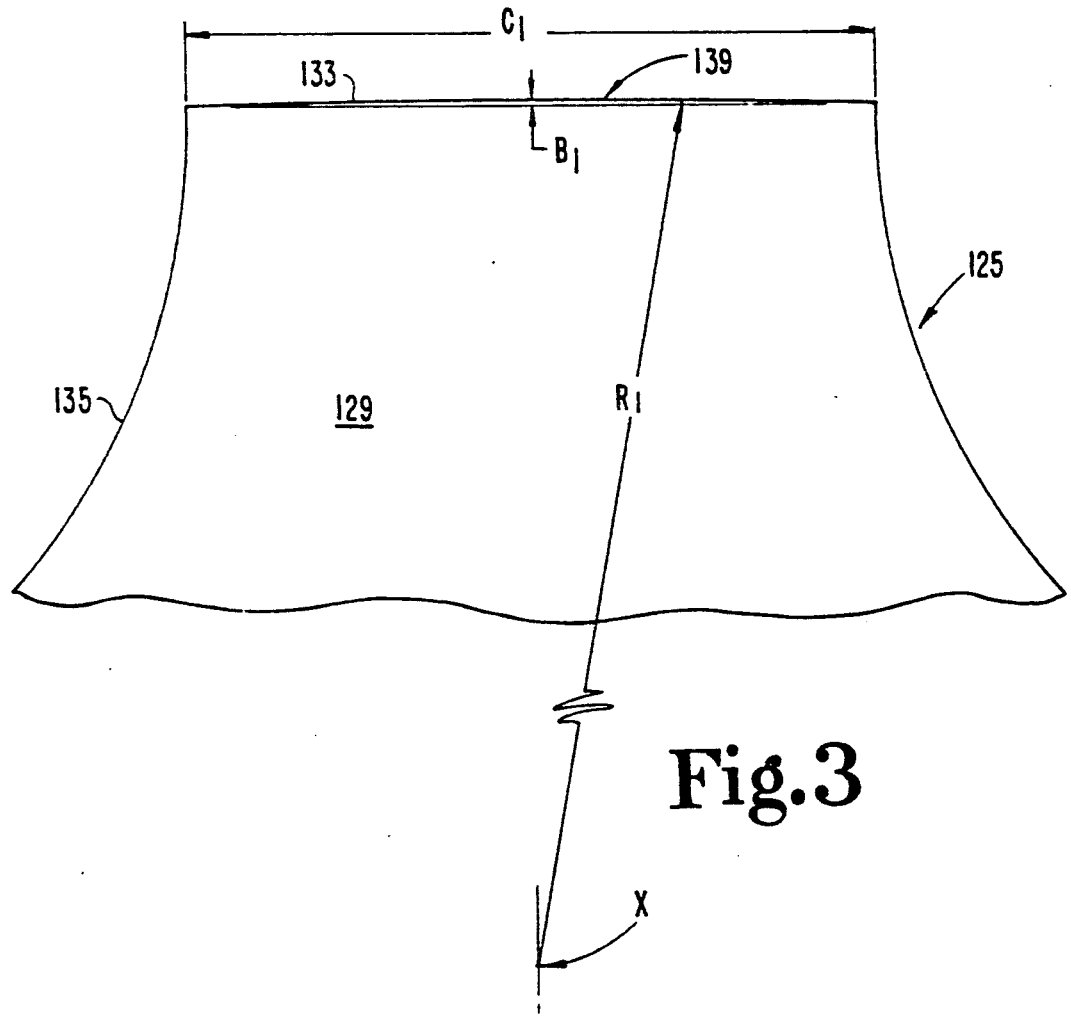
Fig.3

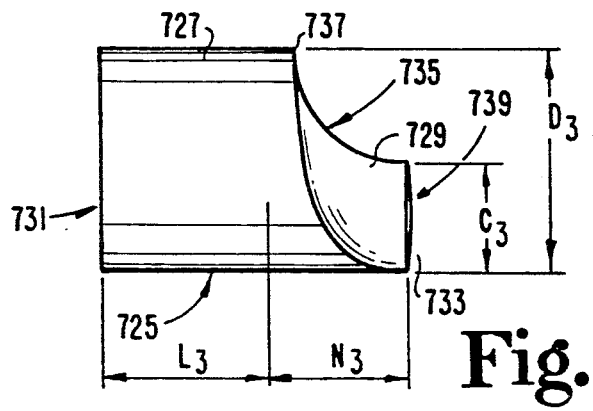
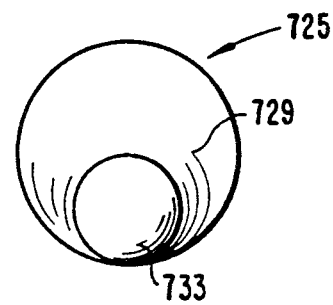
Fig.7A  Fig.7B
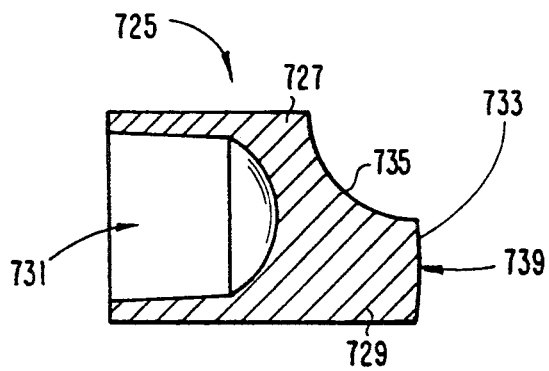
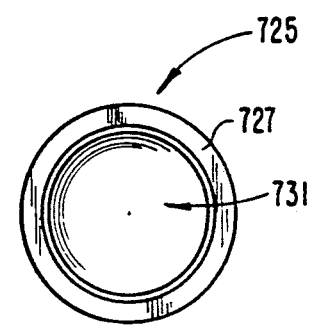
Fig.7D  Fig.7C
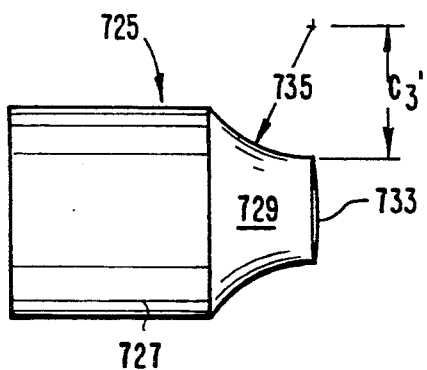
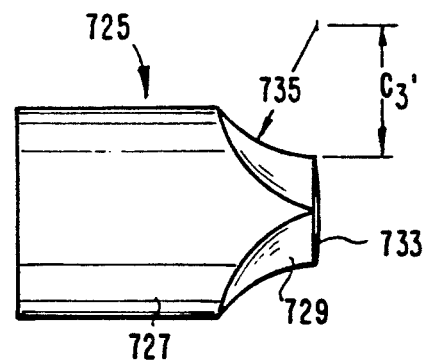
Fig.7E  Fig.7F

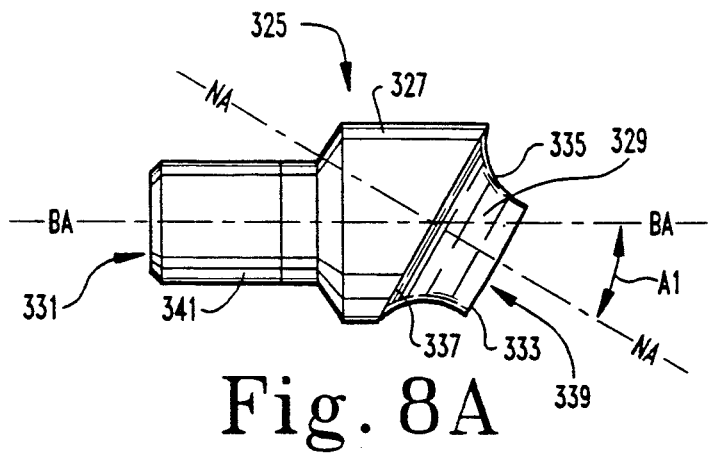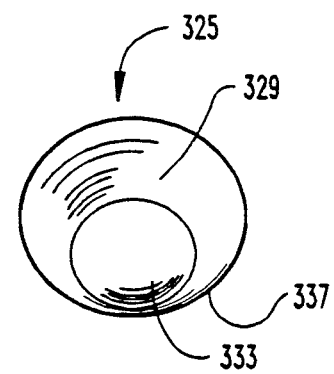
Fig. 8A   Fig. 8B
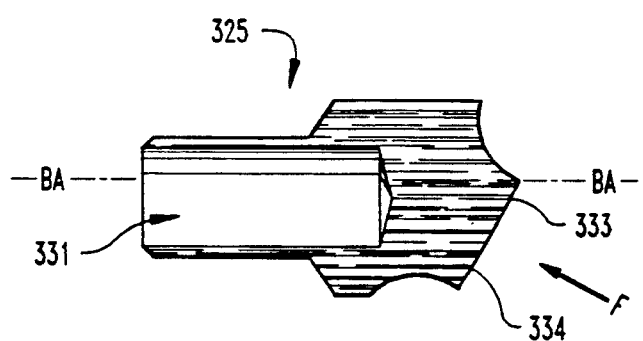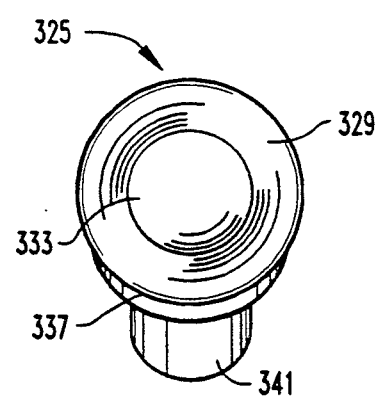
Fig. 8C   Fig. 8D
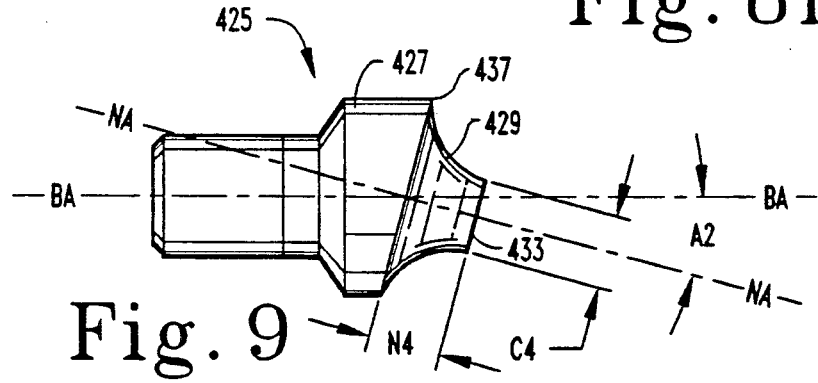
Fig. 9
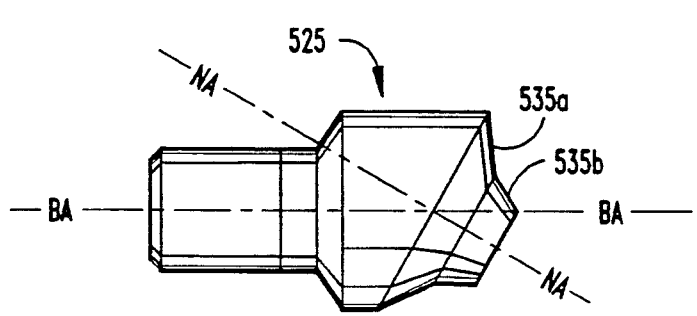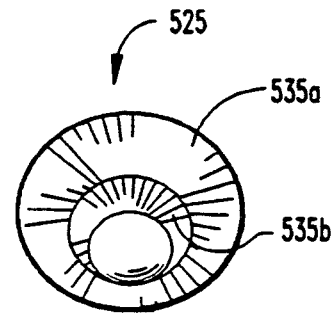
Fig. 10A   Fig. 10B

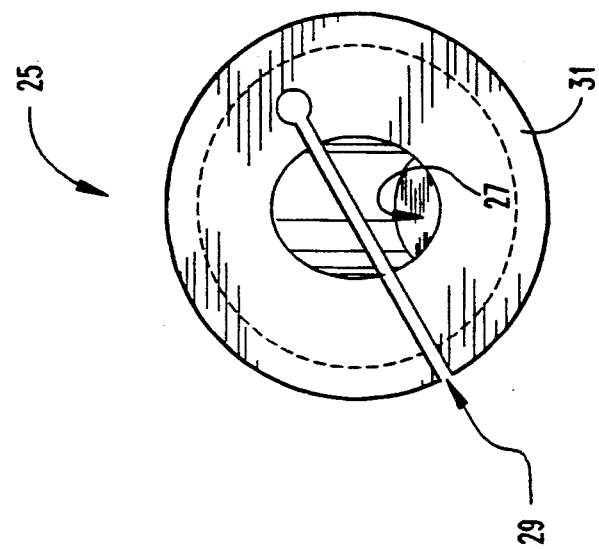
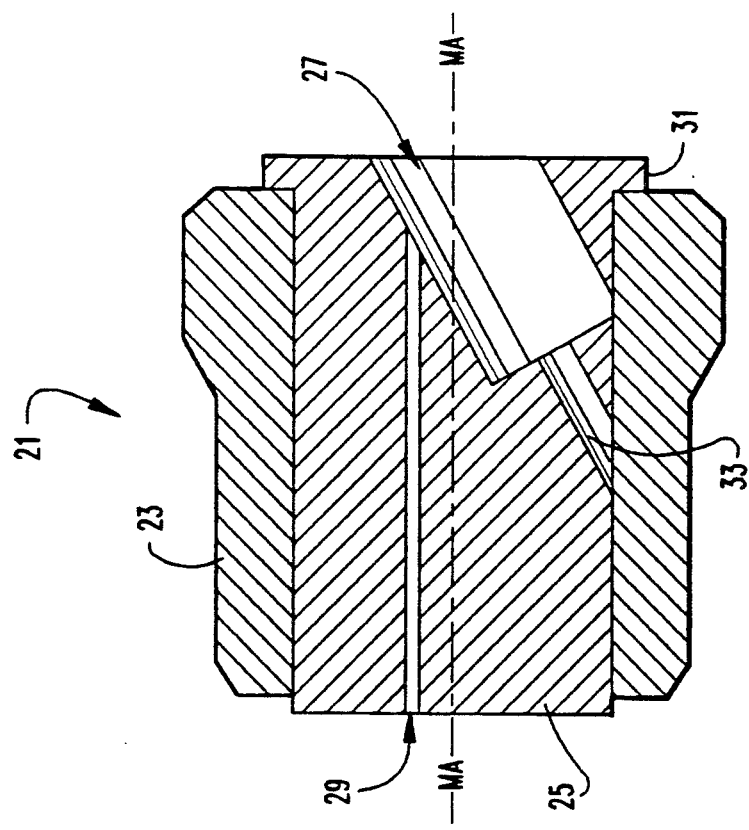
Fig.14C
Fig.14B

RESISTANCE WELDING ELECTRODE HAVING AN ANGLED NOSE AND PROCESS OF FABRICATION THEREOF

REFERENCE TO RELATED APPLICATIONS

This application is a continuation-in-part of our co-pending patent application Ser. No. 410,823, filed Sep. 26, 1989, now U.S. Pat. No. 5,015,816 which is a continuation-in-part of patent application Ser. No. 260,196, filed Oct. 20, 1988, now U.S. Pat. No. 4,954,687.

BACKGROUND OF THE INVENTION

The present invention relates to resistance welding electrodes and processes using welding electrodes, and more specifically to improved electrodes having selected shapes and welding current characteristics.

Resistance welding is a process used to permanently join metals such as steel sheet or other stock by typically pressing the stock together between a pair of electrodes, and then passing an electrical current from one electrode through the metal stock and into the other electrode. The electrical current involved is sufficiently high to cause sufficient heat due to electrical resistance to partially and momentarily melt the mating (or faying) surfaces of the metal stock at this point. In addition to this heat, sufficient pressure is applied to the stock by the welding tip faces of the electrodes to fuse the sheets of steel or other stock at this point into what is commonly called a weld nugget. Over time, this repeated heating and pressing operation causes breakdown, softening, mushrooming and other deformation of the electrodes. As this occurs, current requirements increase with the enlarged welding tip face contacting the stock until ultimately, replacement is required.

Furthermore, the steel being welded today is often galvanized, or coated with a zinc or other softer metal coating. This is especially true, for example, in the automotive industry. Under the heat and pressure of welding, this coating will tend to push aside and collect and also alloy with the electrodes which are typically a copper based metal. Both interfere with the welding process, but the alloying tends to compound the problems even more by further softening and increasing the electrical resistance at the surface thereby speeding up the breakdown and deformation of the electrodes. Due to the cost of replacing and/or refacing worn electrodes, it is the continuing desire of industry to increase the operational life of a resistance welding electrode at a reasonable cost. It is also the desire to minimize the electrical energy required to form a weld from both a cost and safety standpoint.

In a paper entitled NON-UNIFORM CURRENT DISTRIBUTION IN SPOT WELDING written by R. J. Bowers and T. W. Eagar of M.I.T., presented in October of 1986 at the AWS's conference in Dearborn, Mich., the problem of electrode wear was addressed. Using finite element analysis, current density in different geometries of welding electrodes was computer modeled. The authors indicated that an optimal welding electrode geometry exists which balances two competing mechanisms of wear: uniform current distribution and mechanical/thermal stiffness. The suggested geometry, in FIG. 12 of the paper, is an electrode with a body portion, a nose portion having a welding tip face, and a concave, radiused taper from the welding tip face to the outer circumference of the electrode. The paper also concludes that electrode sheet interface angles approaching 90 degrees provide more uniform current distributions at the electrode face. However, the paper deals primarily with theory of geometric shapes, and focuses only on certain aspects of electrode design without addressing each of the many considerations in making a practical electrode, such as material selection.

As to material selection for such electrodes, this is addressed in U.S. Pat. No. 4,588,870 to Nadkarni et al., using a generally similar electrode shape to that disclosed in the M.I.T. paper above. In the Nadkarni '870 patent, it was demonstrated that conventional materials such as copper alloyed or otherwise combined with chromium, zirconium, cadmium, cobalt, nickel, beryllium, tungsten and/or molybdenum clearly cannot be used very well with the electrode shape disclosed in that patent. Such conventional copper alloys are reported to be severely softened by the high temperature, resulting in rapid mushrooming. In testing such copper alloys, Nadkarni '870 disclosed that on the 243rd weld both electrodes stuck badly to the galvanized steel and pulled off the adapters thereby evidencing failure. Instead, Nadkarni '870 indicates that success was obtained if the electrodes are formed of dispersion-strengthened copper rather than any of the conventional copper alloys.

However, dispersion-strengthened copper may require an extra fabricating step to cold form or upset the metal, and is quite expensive, typically several times the cost of conventional alloys. Accordingly, it is highly desirable to provide a welding electrode which takes advantage of the current density properties of electrodes as theoretically discussed in the M.I.T. paper while avoiding the difficulties of dispersion-strengthened copper caps and composite caps as required in the Nadkarni '870 patent. The present invention provides such a solution.

For example, dispersion-strengthened copper electrodes typically require significant conditioning early in the form of multiple runs before production welds can be made and before they attain any semblance of the desired generally-linear relationship between the number of welds and the weld current required. By reviewing the tables of the Nadkarni '870 patent, for early welds the rate of increase in weld current is fairly high for its electrodes up to about 500 welds. Only after this conditioning does the rate of increase in weld current tend to level out to a more linear function with a flatter slope.

It is a significant commercial desire to eliminate this need for preproduction conditioning of electrodes, and to have electrodes which exhibit a a generally-linear weld current relationship throughout their life. This would be of significant value to industry, as welders could then make quality welds from the beginning without wasting production time conditioning each set of electrodes for several hundred welds. Also, welders are "stepped", or in other words, operated by increasing the electrical current amperage across the electrodes incrementally as the number of welds performed by the electrodes increases. During the life of the electrodes, they wear and may mushroom, resulting in an increasing surface area of the welding tip face as the number of total welds increases. Current stepping is done to maintain a generally constant current density at the welding tip face of the electrode by increasing the current to proportionally correspond to the increasing surface area of the welding tip face. Thus, stepping is used to maintain a generally constant current density. Unfortunately, with some prior electrodes, to maintain a generally constant current density suitable for welds, the rate of increasing current is not constant. However, the present invention provides a substantially-linear rate of increase of weld current, and thus it is easier for the operator to follow the optimal rate of current stepping thereby extending electrode life and reducing production costs.

The present invention provides these benefits. It reduces the amount of current required over more conventional electrodes for a given weld nugget, thus allowing energy savings and smaller welding equipment thereby reducing capital costs and space requirements which in turn may lead to more automation and reduced utility installation costs. Electrode life is extended as well, reducing replacement and/or refacing costs for electrodes. These advantages are provided while preferably avoiding the high cost of dispersion-strengthened copper. However, with an angled nose embodiment of the invention, dispersion strengthened material may be used, although this results in a higher material cost. Also, the weld current charateristics of the invention are significantly improved, and provide for more uniform current stepping in welding processes to extend electrode life and improve operator efficiency.

These benefits are realized by a selected combination of electrode shapes, electrode metallurgy and electrical current stepping processes. In addition to the use of a concave profile taper such as that set forth in the M.I.T. paper discussed above, the present invention utilizes a specially-shaped welding tip face. More particularly, the welding tip face is fabricated within a selected range of convex curvatures which differ significantly in function and effectiveness from those disclosed in the Nadkarni '870 patent. Accordingly, contrary to the teachings of that patent, the present invention enables more conventional, less expensive copper alloys or copper to be used successfully and greatly reduces or eliminates the need for electrode conditioning experienced with dispersion-strengthened copper. Also, the present invention provides a self-dressing function by mushrooming in a controlled manner. The present invention also provides a more linear weld current function which is continuously stepped up as welding progresses, thus providing a significant advance in the art.

SUMMARY OF THE INVENTION

According to one embodiment, a resistance welding electrode is provided which comprises a process for fabricating a resistance welding electrode, comprising: mounting an electrically conductive metal blank having a front end and an opposite rear end in a holder, the blank having a base axis running centrally therethrough between the front end and the rear end, the holder having a major axis, wherein the blank is mounted in the holder so that the base axis and the major axis are oriented with respect to each other at a mounting angle less than 180° so that the base axis and the major axis are nonparallel; engaging a cutting tool with the blank for cutting a nose portion from the front end of the blank; and spinning the blank and the cutting tool with respect to each other about the major axis to cut the front end of the blank to form the nose portion having a nose axis which coincides with the major axis, wherein the base axis and the nose axis are oriented with respect to each other at a nose angle less than 180° so that the base axis and the nose axis are nonparallel, the nose portion being tapered down to a welding tip face, wherein the spinning step to cut the blank includes the step of cutting the nose portion into a concave profile taper.

The present invention also provides a resistance welding electrode, comprising an electrically conductive base portion defining a central base axis longitudinally therethrough; and an electrically conductive nose portion projecting from the base portion an axial nose length and terminating in a welding tip face, wherein the nose portion tapers inwardly between the base portion and the welding tip face with a concave profile taper, the nose portion defining a nose axis therethrough, the nose axis being generally normal to the welding tip face; and wherein the base axis and the nose axis are oriented with respect to each other at a nose angle less than 180° so that the base axis and the nose axis are nonparallel.

The invention further provides for simplified conditioning of welding electrodes for welding coated metal into a series of weld joints.

The invention also provides an angled nose electrode with a concave profile taper, having the advantages of the other features set forth herein and being especially suitable for scissor type welding machines. Also, the invention provides unique orienting of the grain structure at a non-normal angle with respect to the welding face which is useful to resist cracking, especially with materials such as dispersion strengthened copper.

The invention provides a novel electrode fabrication process to provide angled noses with concave profiles.

The invention provides these advantages using low cost conventional copper alloys. Also, the present invention may be used with essentially pure copper which has been found especially useful in welding aluminum.

Accompanying objects of the invention are to provide an improved resistance welding electrode and process incorporating a particularly advantageous electrode geometry and utilizing a conventional copper alloy while eliminating the need for pre-conditioning and reducing overall costs while increasing operator efficiency and electrode life. These and related objects will be apparent in view of the present disclosure.

BRIEF DESCRIPTION OF THE DRAWINGS

FIG. 2C is a rear view of the electrode of FIG. 2A;

FIG. 2D is a side view in full section of the electrode of FIG. 2A;

FIG. 3 is a side detail view of a portion of the first embodiment of an electrode according to the present invention;

FIG. 7A is a side view of a third embodiment of a female electrode according to the present invention;

FIG. 7B is a front view of the electrode of FIG. 7A;

FIG. 7C is a rear view of the electrode of FIG. 7A;

FIG. 7D is a side view in full section of the electrode of FIG. 7A;

FIG. 7E is a top view of the electrode of FIG. 7A;

FIG. 7F is a bottom view of the electrode of FIG. 7A;

FIG. 8A is a side view of a fourth embodiment of a male electrode according to the present invention;

FIG. 8B is a front view of the electrode of FIG. 8A from a frontal perspective looking along base axis BA;

FIG. 8C is a side view in full section of the electrode of FIG. 8A showing co-axial, anisotropic fibrous grain structure;

FIG. 8D is a front view of the electrode of FIG. 8A from a frontal perspective along nose axis NA;

FIG. 9 is a side view of a fifth embodiment of a male electrode according to the present invention;

FIG. 10A is a side view of a sixth embodiment of a male electrode according to the present invention;

FIG. 10B is a front view of the electrode of FIG. 10A from a frontal perspective along base axis BA;

FIG. 14B is a side view in full section of a holder assembly used to fabricate the electrode of FIG. 8A;

FIG. 14C is a front view of the angled offset collet insert used in the assembly of FIG. 14B;

DESCRIPTION OF THE PREFERRED EMBODIMENT

Figure 1A:
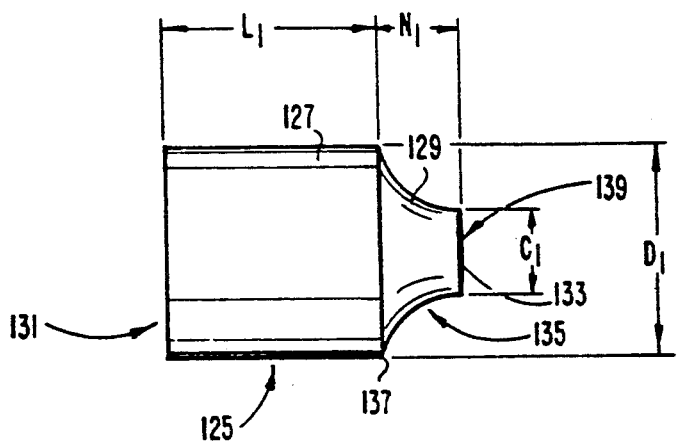
FIG. 1A is a side view of a first embodiment of a female electrode according to the present invention.
Figure 1B:
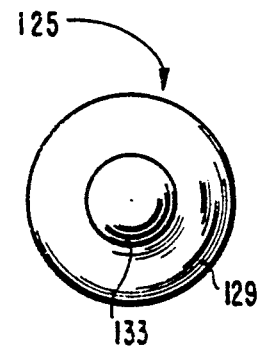
FIG. 1B is a front view of the electrode of FIG. 1A.
Figure 1D:
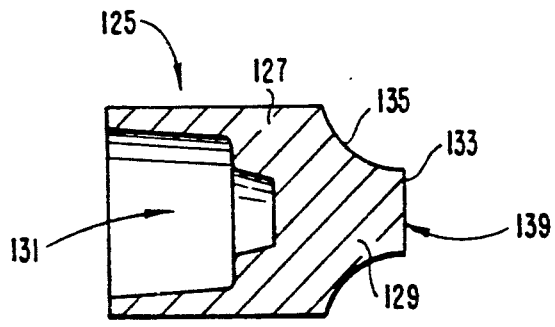
FIG. 1D is a side view in full section of the electrode of FIG. 1A.
Figure 1C:
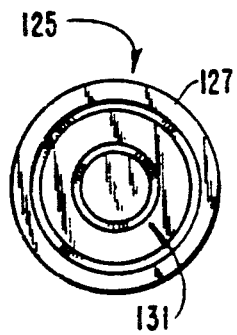
FIG. 1C is a rear view of the electrode of FIG. 1A.
Figure 2A:
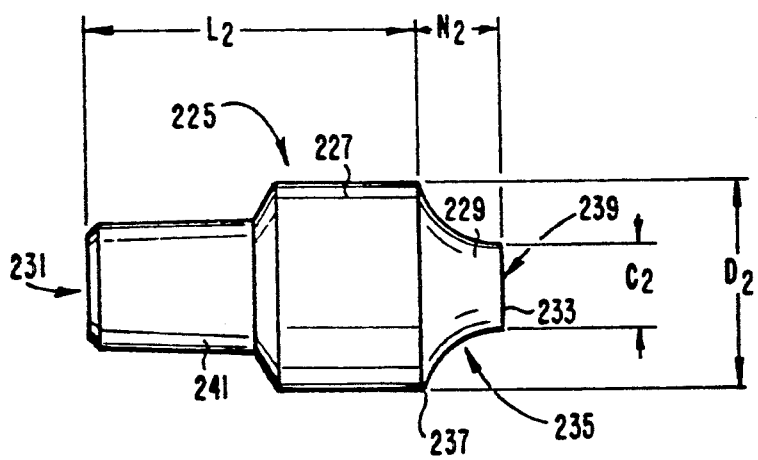
FIG. 2A is a side view of a second embodiment of a male electrode according to the present invention.
Figure 2B:
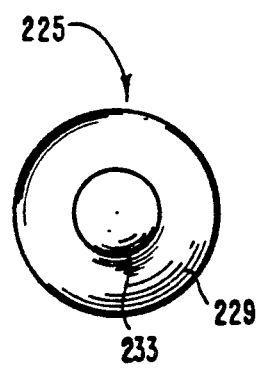
FIG. 2B is a front view of the electrode of FIG. 2A.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated devices and processes, and such further applications of the principles of the invention as illustrated therein being contemplated as would normally occur to one skilled in the art to which the invention relates.

Referring to FIGS. 1A, 1B, 1C, 1D, and 3, a first embodiment of the present invention is shown. The first embodiment is identified with reference numbers in the "100" series (i.e. a "1" and hundredths digit). The other eight embodiments as described further below have a different number in the hundredths digit corresponding to each respective embodiment while generally utilizing the same reference numbers in the tens and units digits for the same or similar structure. Electrode body 125 is a resistance welding electrode designed to be mounted on electrode holders, as is known and disclosed in the Resistance Welding Products catalog of the Assignee of the present invention, CMW, Inc. of Indianapolis, Ind., such catalog hereby being expressly incorporated by reference. Electrode body 125 has base portion 127 and nose portion 129. Base portion 127 has a base length $L_1$; nose portion 129 has an axial nose length $N_1$. Body 125 has cooling recess 131 therein and adapted for cooling fluids such as, for example, water. Cooling recess 131 may have a variety of shapes. Nose portion 129 projects from base portion 127 and terminates in an integrally fabricated welding tip face 133. Welding tip face 133 may be fabricated from a variety of methods such as cold forming, but often is machined on a lathe. The same is true for the rest of the electrode. Concave profile 135 lies between welding tip face 133 and base portion 127, ending at shoulder 137 in the illustrated embodiment. Accordingly, nose portion 129 tapers inwardly between base portion 127 and welding tip 133 with a concave profile taper 135. Note that the present invention, including the base portion, may comprise a full sized electrode with a shaft as well as the electrode caps illustrated in the drawing figures. More specifically, concave profile 135 may define a frustum of a vortical surface, appearing somewhat like a trumpet, and in the preferred embodiment, concave profile 135 has a concave curvature of an arc of a circle. The concave radius of curvature of the concave profile may vary. However, in the first embodiment of the electrode of the present invention illustrated, concave profile 135 has a curvature of an arc of a circle with a one quarter inch radius. Furthermore, the welding tip face diameter $C_1$ is likewise about 0.25 inches. In the first embodiment, axial nose length $N_1$ is about a quarter of an inch long. Accordingly, welding tip face diameter $C_1$ and axial nose length $N_1$ are about equal in length in the preferred embodiment. These dimensions are typically used when electrode 125 has a base diameter $D_1$ of about five eighths of an inch.

Various other dimensions may be used. For example, base diameter $D_1$ may equal three quarters of an inch. In such embodiment, typically welding tip face diameter $C_1$ is nine thirty-seconds of an inch, axial nose length $N_1$ is 0.35 inches, base length $L_1$ is 0.65 inches, and the concave radius of curvature defining concave profile 135 is a radius of about ⅜ inch. These dimensions may vary while being within the scope of the present invention. Furthermore, concave profile 135 does not necessarily have to be defined by the arc of a circle, but may have a variety of other curvatures or incremental linear segments.

Figure 4:
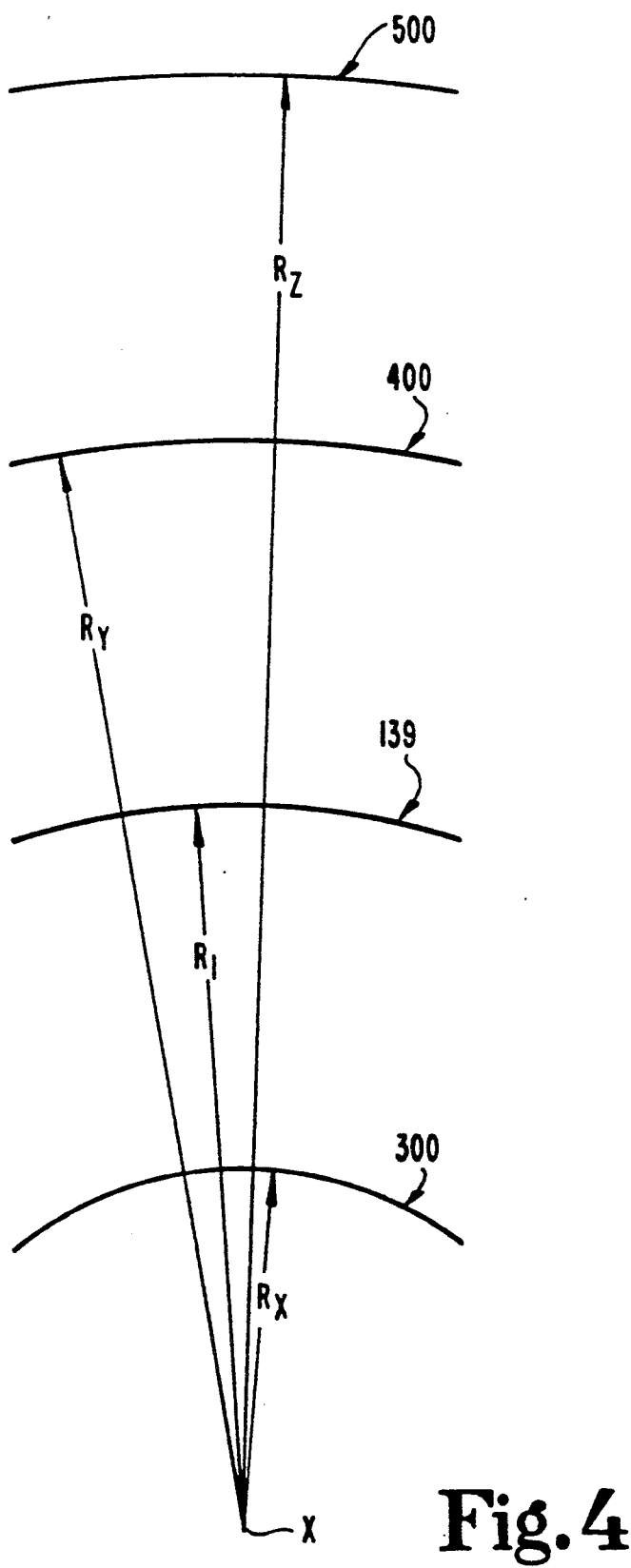
FIG. 4 is a diagram showing the welding tip face curvature of the first embodiment of an electrode according to the present invention within a range of convex radiuses of curvature.

Welding tip face 133 has a convex welding tip curvature 139. Thus, welding tip face 133 forms a crown or a slight dome above an imaginary planar surface defined by the perimeter of face 133. Referring specifically to FIGS. 3 and 4, convex welding tip curvature 139 may be defined by a convex radius of curvature $R_1$. In the present invention, radius of curvature $R_1$ is a radius of curvature falling between two inches and eight inches, and preferably is about four inches in length. As illustrated in FIG. 4, radius of curvature $R_1$ is four inches taken from center of curvature X to convex welding tip curvature 139. This four inch radius of curvature falls between the two inch radius of curvature $R_X$ (defining two inch curvature 300) and eight inch radius of curvature $R_Z$ (defining eight inch curvature 500). Curvature 139 also falls between the two inch radius of curvature $R_X$ and six inch radius of curvature $R_Y$ (defining six inch curvature 400). As illustrated in FIG. 4, convex welding tip curvature 139 forms a sharper curvature than six inch curvature 400, whereas two inch curvature 300 forms an even sharper curvature than curvature 139. Six inch curvature 400 is sharper than both curvature 500 and a flat surface which would theoretically be defined by an infinite radius of curvature.

As illustrated in FIG. 3, electrode 125's nose portion 129 has a welding tip face diameter $C_1$. Convex welding tip curvature 139 of welding tip face 133, which, as illustrated, is defined by convex radius of curvature $R_1$ taken from center of curvature X, and face diameter $C_1$ define crown height $B_1$. The mathematical relationship of a convex radius of curvature R, a welding tip face diameter C (which forms a chord of a circle), and a crown height B is defined by the mathematical equation:

$$B = R - \tfrac{1}{2}\sqrt{4R^2 - C^2}$$

Accordingly, for the first embodiment of the present invention where $R_1$ equals four inches, and where $C_1$ equals one quarter inch, crown height $B_1$ is mathematically calculated to be 0.00195 inches taken at the axial center of welding tip face 133. In fact, due to fabricating controls, crown height $B_1$ is more like 0.0019 or 0.002 inches. Although machining is typically used to fabricate the curvature, other processes such as cold forming can be used, particularly with sophisticated cold forming machines. The tolerances for curvature 139, and more particularly for crown height $B_1$, may vary. However, for an electrode, such as electrode 125, with a curvature defined by radius $R_1$ of about four inches and a crown height $B_1$ of about 0.002 inches, an acceptable tolerance for crown height $B_1$ is believed to be about $+0.001$ and $-0.0005$. Thus, this gives a range for crown height $B_1$ for such an electrode of about 0.003 inches to about 0.0015 inches. Curvature 139, and curvature 239 discussed below, are set forth to be general curvatures within the range of about a two inch and a eight inch radius of curvature. Such general curvature encompasses curvatures which, for a selected part of their curvature surface, fall outside of the two inch to eight inch range or form a slight cusp, if overall, the average effective curvature on the welding tip face falls within that range, affording the benefits of the present invention. Such general convex curvature functions to allow the concave profiled shape to be used with conventional copper alloys and combinations without undue sticking and without excess conditioning. Such curvatures may include noncircular curvatures, such as third order curves, although circular curves are preferred due to machining considerations.

Referring now to FIGS. 2A, 2B, 2C and 2D, a second embodiment of the present invention is shown. The primary difference between the second embodiment and the first embodiment is that the second embodiment is a male electrode, as is known in the trade by virtue of male projection 241, whereas the first embodiment is a female electrode. Electrode 225 has base portion 227 and nose portion 229. Base portion 227 includes male projection 241 and has cooling recess 231 therein. Nose portion 229 projects from base portion 227 and terminates in an integrally fabricated welding tip face 233.

Nose portion 229 tapers inwardly between base portion 227 and welding tip face 233 with a concave profile 235 taper, similar to that described with the first embodiment. Shoulder 237 is provided. Alternatively, shoulder 237, like shoulder 137, may be rounded off (not shown) if desired.

Welding tip face 233 has convex welding tip curvature 239 which is structurally and functionally similar to convex welding tip curvature 139 previously described. As such, convex welding tip curvature 239 preferably generally falls between a radius of curvature of two inches and a radius of curvature of eight inches, and preferably has a radius of curvature of about four inches. However, the present invention is effective with a radius of curvature of about nine inches and beyond where the crown height functionally serves to prevent sticking during early welds.

The dimensions of electrode 225 may vary, but include base diameter $D_2$, axial nose length $N_2$, base length $L_2$, and welding tip face diameter $C_2$. These dimensions may be similar to the female embodiment previously described with the exception that typically base length $L_2$ is longer than base length $L_1$ due to the presence of male projection 241. For example, base length $L_2$ is preferably about $1\tfrac{1}{4}$ inch where base diameter $D_2$ is $\tfrac{3}{8}$ inch. As is known, male projection 241 provides a male fitting for insertion into an electrode holder, whereas female electrodes typically receive a male portion from the electrode holder. Nose portion 229 has a concave profile 235 similar to concave profile 135 previously described, and preferably is a frustum of a vortical surface having a trumpet-like shape.

Referring now to FIGS. 7A, 7B, 7C, 7D, 7E and 7F, a third embodiment of the present invention is shown. The primary difference between the third embodiment and the first embodiment is that the third embodiment has a nose portion which is axially offset from the base portion, whereas the first embodiment (and the second embodiment) nose portion is axially centered with respect to the base portion. Specifically, electrode 725 has nose portion 729 axially offset from base portion 727. Note that although electrode 725 is a female electrode, this offset embodiment may also be provided in a male electrode version (not shown) having a male projection similar to male projection 241 described with respect to the second embodiment above.

Electrode 725's base portion 727 has cooling recess 731 therein. Nose portion 729 projects from base portion 727 and terminates in an integrally fabricated welding tip face 733. Nose portion 729 tapers inwardly between base portion 727 and welding tip face 733 with a concave profile 735 taper, similar to that described with the first embodiment although corresponding to the offset geometry as illustrated. Specifically, in the illustrated third embodiment, concave profile 735 is a circular curvature having a radius $C_3'$ (see FIGS. 7E and 7F) which is equal or about equal to the welding tip face diameter $C_3$ (see FIG. 7A). This concave profile 735 is preferably maintained constant radially around the perimeter or welding tip face 733. Since in the illustrated embodiment, welding tip face diameter $C_3$ is one-half of the base diameter $D_3$, and since the radius of curvature of concave profile 735 is equal to welding tip face diameter $C_3$, shoulder 737 formed near the top side of base 727 is about ninety degrees at this point, and furthermore, nose length $N_3$ is approximately equal to welding tip face diameter $C_3$. Although these curvatures and dimensions may vary with respect to each other while still performing the self-dressing and structural support functions of the present invention, it is believed that a preferred range of ratios between the welding tip face diameter $C_3$ and the nose length $N_3$, is such that the nose length $N_3$ is somewhere between one-half and two times the welding tip face diameter $C_3$. These ratios ($\frac{1}{2}$:1 to 2:1) are likewise applicable to the previous embodiments already described, with the preferred ratio about 1:1. It is to be further noted that the absolute dimensions dictating the size of electrode 727 may vary depending upon the size of the weld nugget desired.

By way of example, electrode 725 as illustrated has the following dimensions. Base diameter $D_3$ is $\frac{5}{8}$ths of an inch; welding tip face diameter $C_3$ is 5/16ths of an inch; nose length $N_3$ is 5/16ths of an inch; and base length $L_3$ is about 0.58 inches. Other examples include a base diameter of $\frac{5}{8}$ths of an inch with a welding tip face diameter of $\frac{1}{4}$th of an inch; or, a base diameter of 0.482 inches with a welding tip face diameter of $\frac{1}{4}$th of an inch.

It is to be understood that welding tip face 733 has convex welding tip curvature 739 which is structurally and functionally similar to convex welding tip curvature 139 previously described. As such, convex welding tip curvature 739 preferably generally falls between a radius curvature of 2 inches and a radius of curvature of 8 inches. However, it has generally been found that quantification of this curvature may better be expressed in terms of the crown height (such as crown height $B_1$ illustrated in FIG. 3) ranging between about 0.003 inches and about 0.0015 inches, with the preferred value believed to be about 0.002 inches.

The metallurgy used for electrode body 125 or electrode body 225 or electrode body 725 or the other electrodes in FIGS. 8A–13A may vary, but preferably is a conventional copper alloy. For example, such copper alloy may be copper alloyed or otherwise combined with one or more metals selected from the group consisting of chromium, zirconium, cadmium, cobalt, nickel, beryllium, tungsten, aluminum, tungsten carbide, iron, and molybdenum. Preferably, electrodes are made of a metal alloy marketed under the fanciful trademark CMW 3 which is an R.W.M.A. Group A, Class 2 alloy identified as 2.18200 having copper and chromium as the principal elements, offered by the Assignee of this patent application. Such alloy provides good weldability for zinc plated galvanized steel and is considerably less expensive than many other materials such as dispersion-strengthened copper. CMW 3 copper alloy material comprises from about 0.6% to 1.2% chromium, the balance essentially copper.

Referring to FIGS. 8A–8D, a fourth embodiment of the present invention is shown, its principal difference from the earlier embodiments being the angular orientation of nose portion 329 with respect to body portion 327. There is a base axis BA which passes axially through the cylindrical center of electrode 325's base 327. Further, there is a nose axis NA which passes through the center of nose portion 329 in the center of welding tip face 333. Based axis BA and nose axis NA are oriented with respect to each other at a nose angle $A_1$ which in the illustrated embodiment is 30°. Nose angle $A_1$ as well as its supplementary angle of 150° are less than 180° so that base axis BA and nose axis NA are nonparallel. This orientation has been found to be extremely well suited for use in scissor-type welding machines known in the industry which use a scissor action to move two electrodes toward one another, pinching the metal members to be welded therebetween. The use of nose angle $A_1$ is combined with the advantageous concave profile taper 335 and convex welding tip curvature 339 which is similar to curvature 139 as previously described and as illustrated in FIG. 3.

One possible explanation of improve performance is that this face profile simulates from the first weld the profile which is eventually established as the nose portion of the electrode is conditioned. This slight convex shape properly accommodates the competing mechanisms of proper electrically conductive contact between the tip face and the metal being welded and the need to allow clearance for radially outward expulsion of waste material such as zinc and oxides. By having the convex face so shaped, the operator does not need to condition the electrode, but instead begins immediately making production welds. Waste material is removed from the beginning welds, reducing the chance that zinc or some other impurity will imbed and/or alloy in the tip face, planting a "seed" which will grow larger into a failure causing pit. The face profile's electrical conduction is theorized to be enhanced by gaseous plasma formation in the narrow gap between the tip face and the metal being welded. Plasma formation begins near the center of the tip face and expands radially outward in the gap. Two wear mechanisms occur, one at the face center due to metal to metal contact, and the other radially outward from the center due to the plasma and ablating waste material. Current transmission across the plasma occurs without as much heat transmission into the electrode. Reduced heat in the electrode provides reduced wear and reduced resistance. Electrode 325 also has male projection 341 and cooling recess 331 as previously described.

By comparing FIG. 8B and FIG. 8D, electrode 325 is illustrated from a frontal perspective along base axis BA and along nose axis NA, respectively. From the perspective of FIG. 8B, shoulder 337 is preferably circular in shape while the shape of face 333 appears as a horizontal ellipse. From the perspective shown in FIG. 8D, face 333 has a circular shape whereas shoulder 337 has the shape of a vertical ellipse.

Referring to FIG. 8C, the grain structure of the preferred embodiment of electrode 325 is illustrated. Although electrode 325 may advantageously be made of a conventional copper material as previously described or of essentially pure copper, in the illustrated embodiment electrode 325 is made of dispersion strengthened copper, preferably using titanium diboride as the dispersoid. Other dispersoids may be used such as aluminum, alumina and others. Electrode 325 is made from extruded bar stock cut into a cylindrical blank (see FIG. 14A). As is known, extruded bar stock of dispersion strengthened copper generally has a co-axial, anisotropic fibrous grain structure which is axially aligned parallel to base axis BA as illustrated. This fibrous grain structure previously has been considered a disadvantage, such as discussed in U.S. Pat. No. 4,045,644 to Shafer et al., requiring transverse flow under compression to eliminate this grain structure at the tip to reduce failure by cracking along the grain boundaries. However, as illustrated in FIG. 8C herein, the present electrode is fabricated so that welding tip face 333 is oriented at an angular (non-normal) angle (i.e. not 90°) with respect to the co-axial, anisotropic fibrous grain structure 334 at the welding tip face. Consequently, this grain structure is no longer parallel with the compressional force F applied to welding tip face 333 during welding, and therefore only a component of force F acts to provide shear along the grain boundaries. Accordingly, cracking is resisted without having to undergo an additional fabrication step of reorienting the grain structure. This grain orientation feature, as illustrated in FIG. 8C, may be utilized particularly with dispersion strengthened copper or with other electrically conductive metals, especially those having a tendency to crack along grain boundaries. Although this feature is preferably employed in a device having an angled nose and a concave profile taper as illustrated, it may be similarly used in more conventional electrode shapes such as pointed nose and others.

FIG. 9 illustrates a fifth embodiment with electrode 425 being essentially the same as electrode 325 except that the nose angle $A_2$ between base axis BA and nose axis NA is only 15°. It is to be understood that the illustrated embodiments of 15° and of 30° are merely representative, and any variety of angles greater than 0° and less than 180° may be used although a preferred range is between 0° and 45°. Also, electrode 425 is made of a combination of copper and chromium as previously described as CMW 3 material. FIG. 9 also illustrates nose length $N_4$ and face diameter $C_4$ which are analogous to the nose length and face diameter illustrated in FIGS. 1A and 2A. Preferably, nose length $N_4$ and face diameter $C_4$ are about equal to one another, such as $\frac{1}{4}$ inch, for example. Otherwise, face 433 is preferably slightly convex as illustrated in FIG. 3, although not necessarily so; and, shoulder 457 is elliptical in shape and is located between body portion 427 and nose portion 429.

FIGS. 10A and 10B illustrate a sixth electrode 525 in which concave profile 535 is made up of incremental linear segments 535a and 535b as previously described. These incrementally linear segment profiles are a variation of the arc of a circle curvature profile illustrated in the previous embodiments such as the device of FIG. 8A.

Figure 11:
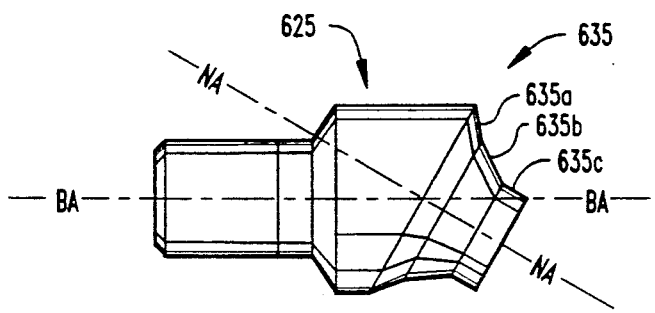
FIG. 11 is a side view of a seventh embodiment of a male electrode according to the present invention.

FIG. 11 illustrates yet another related shape electrode 625 in which concave profile taper 635 has three incremental linear segments 635a, 635b and 635c, instead of the two incremental segments illustrated in FIG. 10A. It is to be understood that similarly four, five or more incremental linear segments may be used in lieu of or in addition to a continuous curve along the concave profile.

Figure 12:
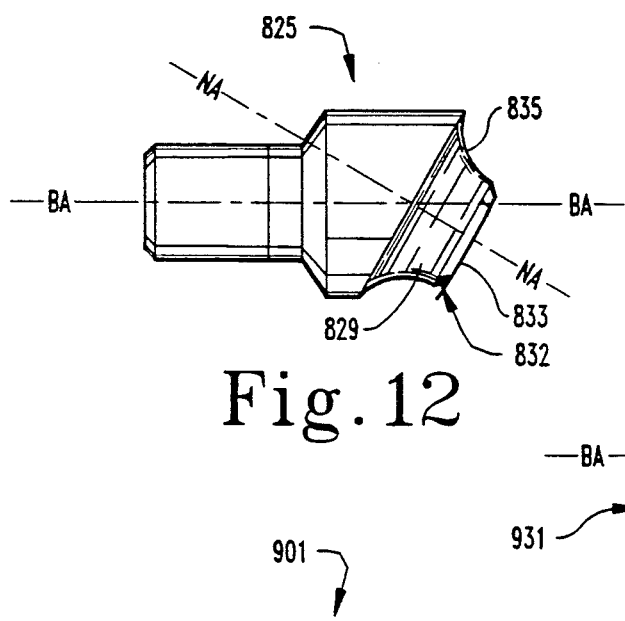
FIG. 12 is a side view of an eighth embodiment of a male electrode according to the present invention.

FIG. 12 illustrates yet another embodiment with electrode 825 having a continuous curve concave paper profile 835 along nose portion 829 while further having a chamfered or beveled surface 832 surrounding welding tip face 833. As illustrated in FIG. 12, this chamfered surface is shown with a linear profile making a frustoconical surface, although other profiles such as curved profiles may likewise be used.

Figure 13A:
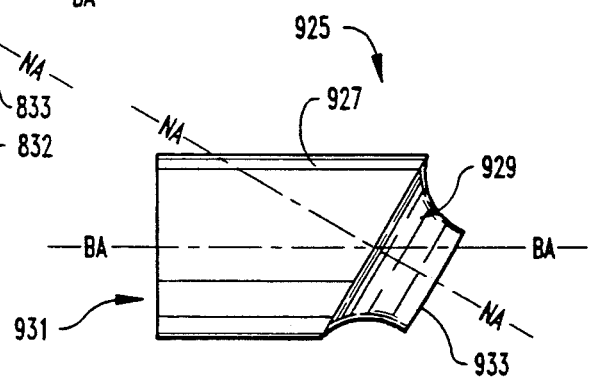
FIG. 13A is a side view of a ninth embodiment of a female electrode according to the present invention.

FIG. 13A shows a ninth embodiment with electrode 925 being a female electrode, analogous to the electrodes of FIGS. 1A–1D and 7A–7F, while further having the feature that nose portion 929 is angularly offset from body portion 927 so that base axis BA and nose axis NA are not parallel as previously described in the embodiment of FIG. 8A. Electrode 925 has a cooling recess 931 similar to cooling recess 131.

It is to be understood that the present invention applies to full size electrodes as well as caps.

Figure 13B:
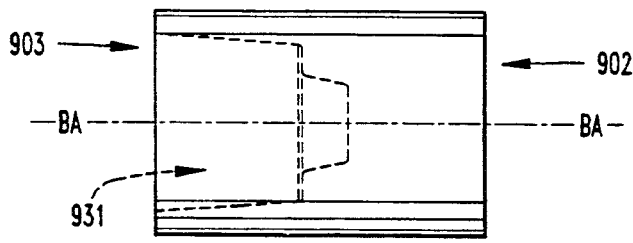
FIG. 13B is a side view of a cylindrical blank used to fabricate the electrode of FIG. 13A.

FIG. 13B shows a cylindrical blank 901 having a front end 902 and a rear end 903 and is the general type used to fabricate a female electrode as illustrated in FIG. 13A. Cooling recess 931 is shown in phantom lines, having been cold formed by a punching operation in a solid cylindrical blank well known in the industry.

Figure 14A:
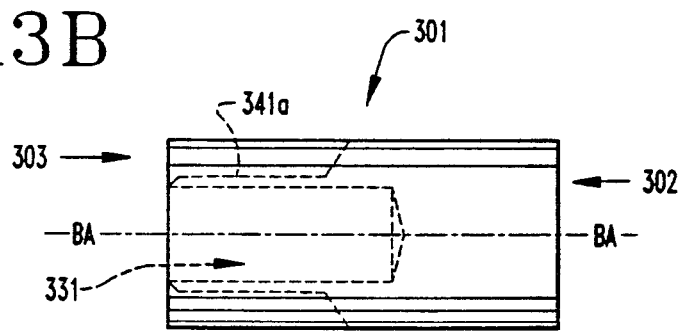
FIG. 14A is a side view of a cylindrical blank used to fabricate the electrode of FIG. 8A.

FIG. 14A shows the slightly longer cylindrical blank 301 used to fabricate a male electrode such as electrode 325. FIG. 14A illustrates cooling recess 331 in phantom lines which is cold formed by a punch. Blank 301 has front end 302 and rear end 303. FIG. 14A further illustrates in phantom lines 341a the configuration which is to be machined away to form male projection 341. Preferably, this process is performed in a lathe operation as is well known by rotation of blank 301 around base axis BA. This cutting to form male projection 341a may occur either before or after formation of nose 329.

FIGS. 14A–14E collectively illustrate the process for fabricating an electrode such as electrode 325. FIG. 14B illustrates mounting assembly 21 used in the fabrication process, it being understood that preferably assembly 21 is mounted in a lathe-type machine, such as a CNC (Computer Numerical Controlled) milling machine providing rotation around major axis MA. Assembly 21 includes collet 23, it having been found that an Erikson 500 Series collet is suitable. Collet insert 25 is held in place by collet 23. As illustrated in FIGS. 14B and 14C, collet insert 25 has a 1/16th inch saw cut through the essentially solid body of collet insert 25. Slot 29 is illustrated as lying in a plane parallel to and somewhat offset from major axis MA as is known in the industry, allowing radially inward flexing of insert 25 upon compressional force from collet 23 to hold the blank to be machined in place. Insert 25 preferably is an angled offset collet insert with hole 27 therein to receive the blank. Preferably, hole 27 is cylindrical in shape, having a depth which is adjustable by depth adjuster 33 (such as a screw or otherwise) and having a diameter which preferably is a few thousandths of an inch greater than the diameter of blank 301. This close fitting diameter allows blank 301 to be held firmly in place when slot 29 allows insert 25 to slightly collapse to hold the blank. Insert 25 also has annular flange 31 to hold it in fixed relation with respect to collet 23.

Figure 14D:
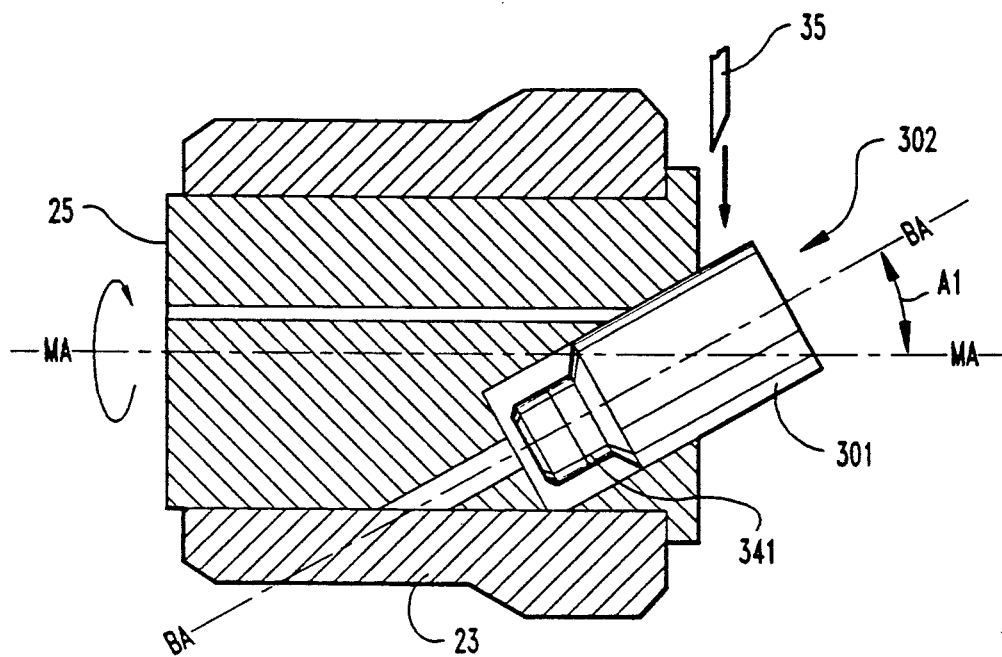
FIG. 14D is an enlarged side cross sectional view of the assembly of FIG. 14B showing a blank mounted therein.

Referring to FIG. 14D, blank 301 is shown inserted into the hole in collet insert 25 along base axis BA. Front end 302 projects outwardly therefrom. The rear end is illustrated as having been previously machined to define male projection 341, although as discussed, this step may be done later in time. Base axis BA and major axis MA are oriented with respect to each other at a mounting angle $A_1$ which is the same as nose angle $A_1$ in FIG. 8A. Angle $A_1$ may vary between 0° and 180° as previously described. In this way, base axis BA and major axis MA are nonparallel. Blank 301 is held securely by compressional forces from collet insert 25. FIG. 14D illustrates cutting tool 35 which may be a variety of cutting tools as generally known. A single point cutting tool, preferably made of carbide is used and is moved both radially inward towards major axis MA and longitudinally with respect to major axis MA during rotation of collet 23 and collet insert 25.

Figure 14E:
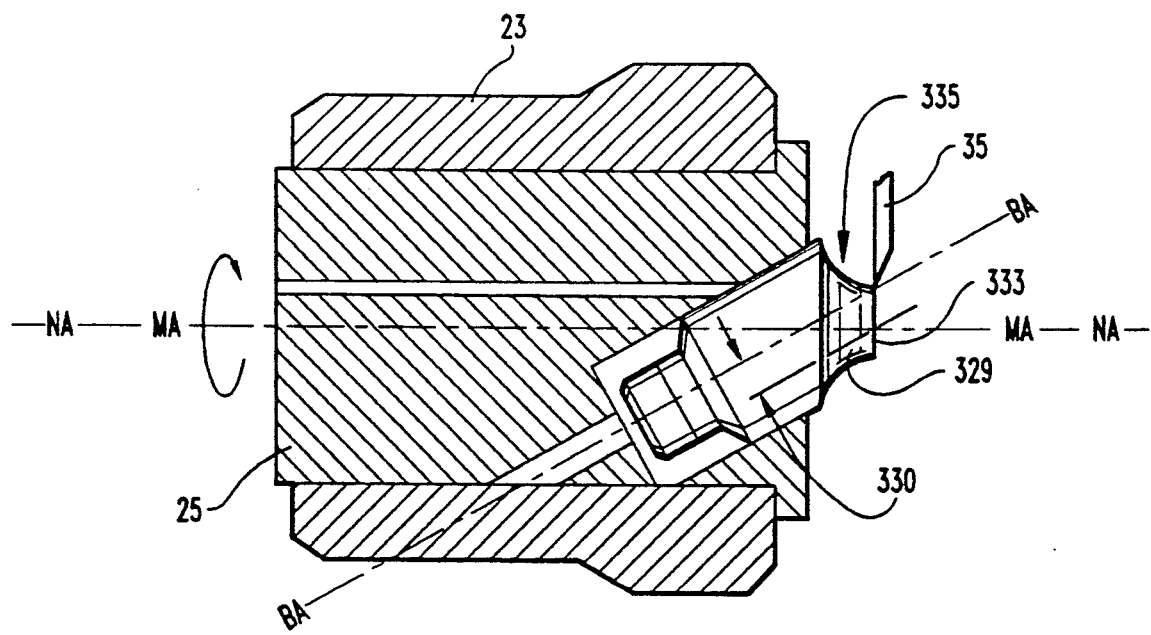
FIG. 14E is a side cross sectional view of the assembly of FIG. 14D after an electrode as illustrated in FIG. 8A has been fabricated.

As illustrated in FIG. 14E, such spinning of blank 301 with respect to cutting tool 35 about major axis MA cuts front end 302 of the blank to form nose portion 329. The CNC device is programmed to move cutting tool 35 to cut off successive layers of material in successive passes until profile 335 is defined. Other cutting tools may be utilized such as cutting tools preshaped to correspond to the finished profile 335 with such cutting tools only being moved radially inward toward major axis MA. FIG. 14E illustrates how major axis MA and nose axis NA coincide with each other.

Referring to FIG. 14E, note that there is an imaginary axis illustrated parallel to base axis BA and offset therefrom by offset 330. This imaginary axis is defined by the axis which is parallel to base axis BA and which passes through the point of intersection of major axis MA and welding tip face 333. Offset 330 may vary, but in the illustrated embodiment is 0.125 inches, resulting in nose portion 329 not only being angularly oriented, but also being slightly offset from base axis BA. Such offset feature is optional, but is believed to provide an improved geometry with advantageous material support of the base behind the nose portion. Another optional feature is to provide an indexing mechanism (not shown) such as a sharp projection along the inner wall of the top side of hole 27 (see FIG. 14B). This projection makes an indexing mark on the corresponding portion of base 327 as the blank is squeezed inside of collet insert 25. This index mark is useful to index angular alignment of electrode 325 in its proper position on a welding machine.

Electrodes of the foregoing shapes may alternatively be made of essentially pure copper, rather than a copper alloy. Such copper electrodes have been found to be especially satisfactory in welding aluminum, aluminum alloys or aluminum coated steel together, but may be used for other metals as set forth in this specification. Aluminim alloys may include for example manganese, magnesium, zinc, copper, silcone, titanium and vanadium. Such tests of welding aluminum have been made with electrodes according to the present invention with copper which is about 99.9% pure, and which is relatively soft (about 25 on the B scale for Rockwell hardness).

Optionally, a coating may be used on the welding tip face of the electrode. Electrode body 125 and electrode body 225 and electrode body 725 may be coated, particularly on their welding tip face, with a very thin coating of, for example, rhodium, zinc, graphite, titanium carbide, grease, soot, or another compound leaving a carbon based deposit. Other suitable coatings may be used within the scope of the present invention. Such coating, while not required, may further help avoid sticking in the very initial twenty or so welds. Presently, graphite has been tested and favorable results achieved even beyond the other advantages of this invention. Such graphite is applied to the welding tip face by pressing and turning the face against a block of graphite, leaving a thin residue of graphite on the face. The advantages of this coating remain even if a significant portion of the graphite is wiped from the welding tip face. Preliminary tests with graphite coating have started at about fourteen thousand amps and continued for about the first thousand welds with little or no current increase required for suitable welds.

Figure 5:
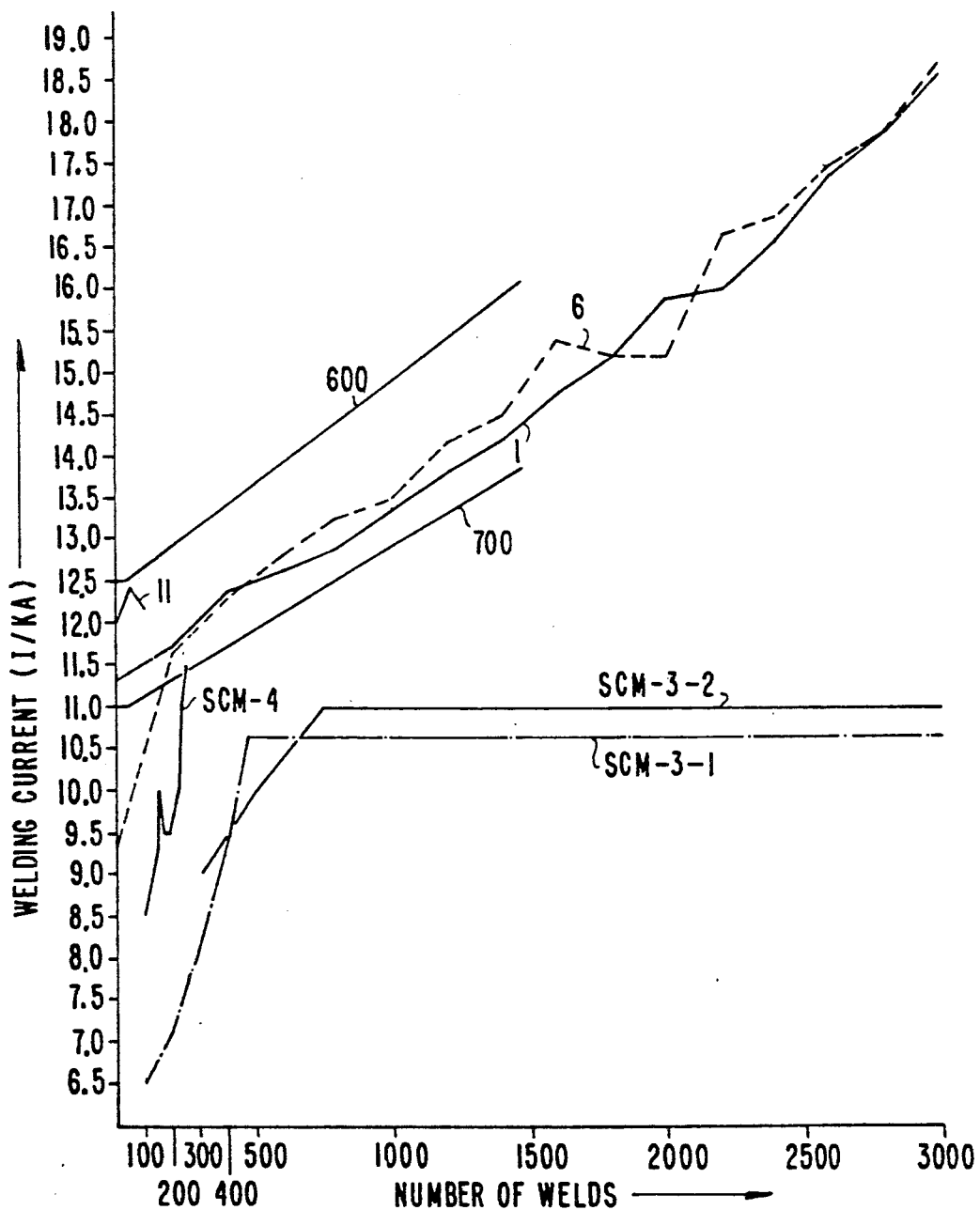
FIG. 5 is a graph plotting the welding current for a number of welds for selected resistance welding electrode designs.
Figure 6:
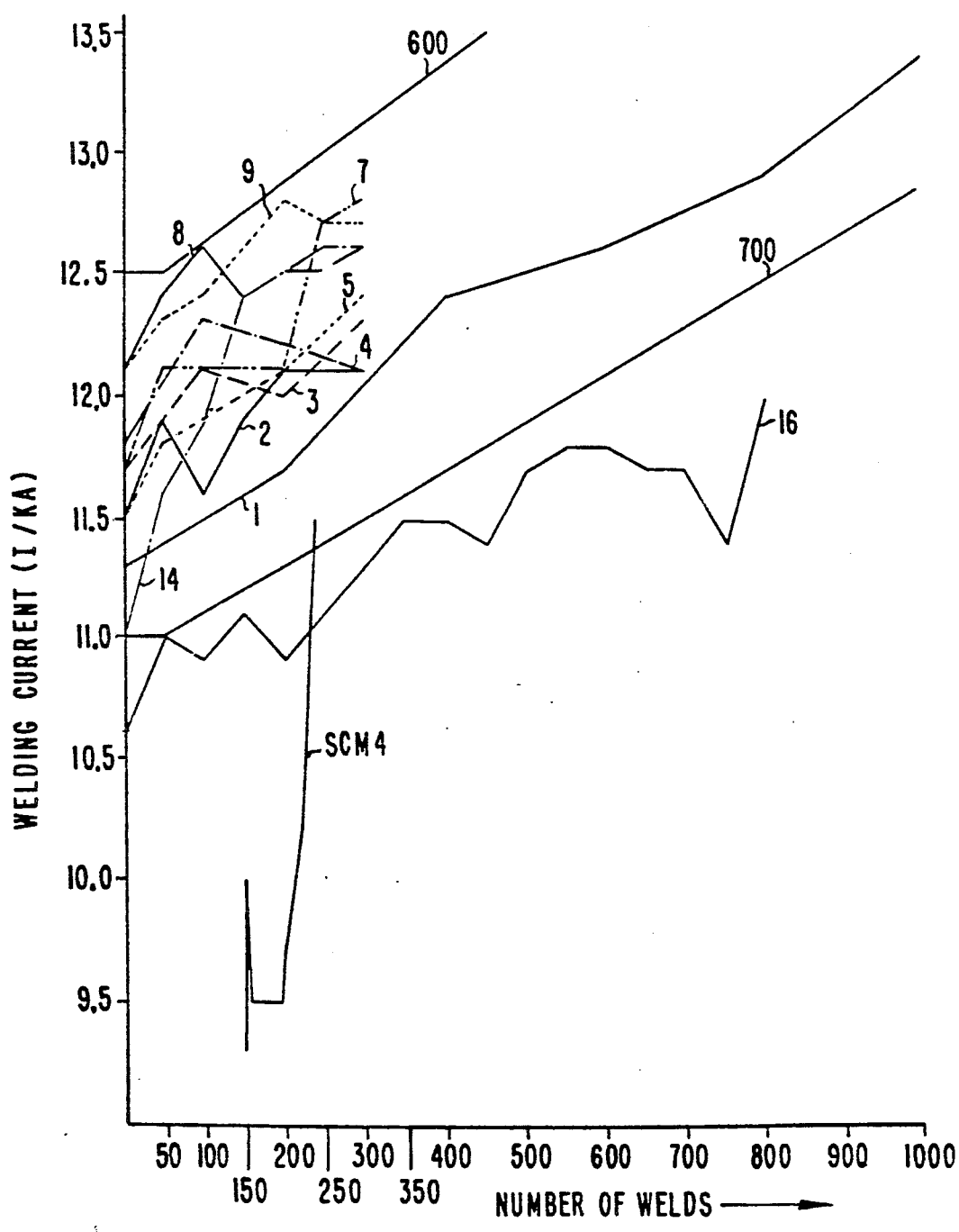
FIG. 6 is an enlarged graph plotting the welding current for a number of welds for selected resistance welding electrode designs.

The following Tables 1 and 2 and the corresponding key to Tables 1 and 2 set forth various selected tests of electrodes. The tables set forth current schedules for various test numbers showing for a given weld number the electrical current in thousands of amps (I/KA), and the weld nugget size in terms of inches (WN). Selected tests from these tables are plotted on the graphs of FIGS. 5 and 6. These graphs plot the number of welds versus the amperage, in kiloamps, showing a current schedule for an electrode. Also plotted on FIGS. 5 and 6 are selected current schedules based on data presented in the Nadkarni '870 patent discussed in the Background of the Invention. Note that the test conditions in the Nadkarni '870 patent do differ from the test conditions for the present invention, and accordingly, this should be considered when comparing the data.

The Tables reflect tests 1 through 16. Of these, the tests plotted on FIG. 5 are test nos. 1, 6, 11, and also the data from the Nadkarni '870 patent from table 3 therein (SCM-3-1, SCM-3-2) and from table 4 (SCM-4) rejecting a conventional copper alloy. The following tests are plotted on FIG. 6: test nos. 1, 2, 3, 4, 5, 7, 8, 9, 14, 16 and SCM-4.

The key to Tables 1 and 2 discloses for a given test number, the face radius R, the base diameter D, whether the electrode was male or female (with an axial centered nose), and the steel type in terms of thickness and galvanizing (i.e. 0.030 inches, G90 grade, commonly known). The spangle pattern was moderately large.

Each of these tests was conducted on electrodes having a concave taper profile nose portion, such as concave profile 135 or concave profile 235. Various face radiuses, or a convex radius of curvature R, were used to determine their current schedule. This data is based on early tests, and was generated from embodiments of the general type illustrated in FIGS. 1A-1D and 2A-2D, and not the other embodiments.

The weld force used for tests was 800 lbs. The squeeze was 80 cycles and the hold time was 5 cycles. For several tests, current pulsation was used, as denoted as a weld cycle of, for example, "7-1-7" for power on for seven cycles, power off for one cycle, and power on for seven cycles. Tests 10, 11, 12, 13, 14, and 15 had a weld cycle of 11-1-11. The remainder of tests had a weld cycle of 7-1-7.

Welds were specified to be for 0.030" steel, a shear of 1100 pounds and a nugget size of 0.160" based on published handbook standards. If welds fell below specification, the current was adjusted. The tests are as follows:

| KEY TO TABLE NOS. 1 and 2 | | | |
|---|---|---|---|
| TEST NO. | FACE RADIUS | BASE DIAMETER | MALE/ FEMALE | STEEL TYPE |
| 1 | 4" | ⅝" | Female | .030" G90 |
| 2 | 4" | ⅝" | Male | .030" G90 |
| 3 | 4" | ⅝" | Male | .030" G90 |
| 4 | 4" | ⅝" | Male | .030" G90 |
| 5 | 4" | ⅝" | Male | .030" G90 |
| 6 | 2" | ⅝" | Female | .030" G90 |
| 7 | 4" | ¾" | Female | .030" G90 |
| 8 | 4" | ¾" | Female | .030" G90 |
| 9 | 4" | ¾" | Female | .030" G90 |
| 10 | 6" | ¾" | Female | .030" G90 |
| 11 | 6" | ¾" | Female | .030" G90 |
| 12 | 6" | ¾" | Female | .030" G90 |
| 13 | 6" | ¾" | Female | .030" G90 |
| 14 | 2" | ¾" | Female | .030" G90 |
| 15 | 2" | ¾" | Female | .030" G90 |
| 16 | 7" | ⅝" | Female | .030" G90 |

TABLE NO. 1

| | Test #1 | | Test #2 | | Test #3 | | Test #4 | | Test #5 | | Test #6 | | Test #7 | | Test #8 | |
|---|---|---|---|---|---|---|---|---|---|---|---|---|---|---|---|---|
| # Welds | I/KA | WN | I/KA | WN | I/KA | WN | I/KA | WN | I/KA | WN | I/KA | WN | I/KA | WN | I/KA | WN |
| 0 | 11.3 | .150 | 11.5 | .165 | 11.7 | .150 | 11.8 | .173 | 11.5 | .173 | 9.3 | .280 | 11.7 | .256 | 12.1 | .220 |

TABLE NO. 1-continued

| # Welds | Test #1 I/KA | WN | Test #2 I/KA | WN | Test #3 I/KA | WN | Test #4 I/KA | WN | Test #5 I/KA | WN | Test #6 I/KA | WN | Test #7 I/KA | WN | Test #8 I/KA | WN |
|---|---|---|---|---|---|---|---|---|---|---|---|---|---|---|---|---|
| 50 | | | 11.9 | .197 | 11.9 | .193 | | | | | | | 12.1 | .197 | 12.4 | .228 |
| 100 | | | 11.6 | .224 | 12.1 | .177 | 12.3 | .189 | 11.8 | .181 | | | 12.1 | .185 | 12.6 | .248 |
| 150 | | | 11.9 | .217 | | | | | | | | | 12.1 | .209 | 12.4 | .240 |
| 200 | 11.7 | .154 | 12.1 | .185 | 12.0 | .197 | 12.2 | .217 | 12.1 | .197 | 11.8 | .138 | 12.1 | .209 | 12.5 | .236 |
| 250 | | | | | | | | | | | | | 12.7 | .228 | 12.5 | .264 |
| 300 | | | 12.1 | .232 | 12.3 | .177 | 12.1 | .220 | 12.4 | .169 | | | 12.8 | .228 | 12.6 | .201 |
| 350 | | | | | | | | | | | | | | | | |
| 400 | 12.4 | .220 | | | | | | | 12.6 | .189 | 12.3 | .161 | | | | |
| 450 | | | | | | | | | | | | | | | | |
| 500 | | | | | | | | | | | | | | | | |
| 550 | | | | | | | | | | | | | | | | |
| 600 | 12.6 | .224 | | | | | | | | | 12.8 | .201 | | | | |
| 650 | | | | | | | | | | | | | | | | |
| 700 | | | | | | | | | | | | | | | | |
| 750 | | | | | | | | | | | | | | | | |
| 800 | 12.9 | .224 | | | | | | | | | 13.3 | .232 | | | | |
| 850 | | | | | | | | | | | | | | | | |
| 900 | | | | | | | | | | | | | | | | |
| 950 | | | | | | | | | | | | | | | | |
| 1000 | 13.4 | .228 | | | | | | | | | 13.5 | .213 | | | | |
| 1200 | 13.8 | .240 | | | | | | | | | 14.2 | .236 | | | | |
| 1400 | 14.2 | .276 | | | | | | | | | 14.5 | .295 | | | | |
| 1600 | 14.8 | .291 | | | | | | | | | 15.4 | .252 | | | | |
| 1800 | 15.2 | .236 | | | | | | | | | 15.2 | .287 | | | | |
| 2000 | 15.9 | .256 | | | | | | | | | 15.2 | .315 | | | | |
| 2200 | 16.0 | .315 | | | | | | | | | 16.7 | .256 | | | | |
| 2400 | 16.6 | .339 | | | | | | | | | 16.9 | .268 | | | | |
| 2600 | 17.4 | .299 | | | | | | | | | 17.5 | .283 | | | | |
| 2800 | 17.9 | .327 | | | | | | | | | 17.9 | .276 | | | | |
| 3000 | 18.6 | .335 | | | | | | | | | 18.7 | .299 | | | | |

TABLE NO. 2

| # Welds | Test #9 I/KA | WN | Test #10 I/KA | WN | Test #11 I/KA | WN | Test #12 I/KA | WN | Test #13 I/KA | WN | Test #14 I/KA | WN | Test #15 I/KA | WN | Test #16 I/KA | WN |
|---|---|---|---|---|---|---|---|---|---|---|---|---|---|---|---|---|
| 0 | 12.1 | .236 | 12.1 | .220 | 12.0 | .177 | 11.6 | .224 | 12.1 | .213 | 11.0 | .213 | 10.9 | .236 | 10.6 | .181 |
| 50 | 12.3 | .220 | 12.3 | .276 | 12.4 | .217 | 11.7 | .201 | 12.3 | .295 | 11.6 | .205 | 11.7 | .193 | 11.0 | .157 |
| 100 | 12.4 | .201 | | | 12.2 | .220 | 12.1 | | | | 11.9 | .201 | 12.3 | .177 | 10.9 | .142 |
| 150 | 12.6 | .197 | | | | | | | | | 12.4 | .213 | 12.5 | .197 | 11.1 | .165 |
| 200 | 12.8 | .193 | | | | | | | | | 12.5 | .228 | 12.8 | .197 | 10.9 | .157 |
| 250 | 12.7 | .209 | | | | | | | | | 12.6 | .197 | 13.1 | .213 | 11.1 | .130 |
| 300 | 12.7 | .193 | | | | | | | | | 12.6 | .157 | 13.3 | .228 | 11.3 | .165 |
| 350 | | | | | | | | | | | | | | | 11.5 | .181 |
| 400 | | | | | | | | | | | | | | | 11.5 | .142 |
| 450 | | | | | | | | | | | | | | | 11.4 | .154 |
| 500 | | | | | | | | | | | | | | | 11.7 | .165 |
| 550 | | | | | | | | | | | | | | | 11.8 | .181 |
| 600 | | | | | | | | | | | | | | | 11.8 | .154 |
| 650 | | | | | | | | | | | | | | | 11.7 | .150 |
| 700 | | | | | | | | | | | | | | | 11.7 | .177 |
| 750 | | | | | | | | | | | | | | | 11.4 | .185 |
| 800 | | | | | | | | | | | | | | | 12.0 | .193 |

In the tests of the foregoing tables, several remarks can be made. Test nos. 10 through 13 with a six inch radius were only tested for initial welds to provide data for this early portion of electrode life. In the various tests, data was taken at a selected weld number, and as the tables reflect, not every test had data taken on the same weld numbers. Accordingly, blanks appear in the tables where data was not taken. Note also, Test no. 1 experienced a good rate of current increase which was substantially linear from 0 welds to 3,000 welds, having an average rate of increase of about 235 amps per 100 welds. These tests are preliminary, and tests are ongoing.

As shown in FIGS. 5 and 6, there is a preferred envelope or range of stepped current increase in which the present invention provides generally consistent and substantially linear current stepper increases. Such envelope is shown on FIG. 5 and FIG. 6 with upper envelope 600 and lower envelope 700. Upper envelope 600 is plotted horizontally from 0 welds to 50 welds at an amperage level of 12,500 amps, and thereafter increases from 50 welds to 1500 welds linearly at a rate of increase of 250 amps per 100 welds. Lower envelope 700 is plotted as a horizontal line from 0 welds to 50 welds at a level of 11,000 amps. Thereafter, from 50 welds through 1500 welds lower envelope 700 increases at a linear rate of 200 amps per 100 welds. As shown, envelopes 600 and 700 end at about 1500 welds reflecting the range of current values during the early life of the electrode fall within such range without undue conditioning. However, the present invention provides for electrode life well beyond 1500 welds, providing cost effective electrodes which typically have a generally constant current stepping rate beyond 1500 welds.

Tests 1-16 were conducted without a coating on the weld tip face of the electrode. However, preliminary tests with a graphite coating, as described above, indicate particularly good results, at least out to 1000 welds and potentially beyond. The rate of current increase for graphite coated electrodes according to the present invention appear to be even less than the uncoated electrodes. Thus, the current schedule when plotted on a current-number of welds graph appears to have a flatter or smaller slope.

The initial 50 welds comprise an established threshold welding current suitable for production weld joints of the galvanized metal between about 11,000 and 12,500 amps. Accordingly, upper envelope 600 and lower envelope 700 define a generally linear path starting at the threshold current through which current profiles are plotted according to the present invention. Welding continues beyond 1500 welds until the electrodes fail. Tests of the present invention have had electrode life beyond four thousand welds before failure. The electrodes are replaced on the welder with other electrodes according to this invention which are new, rather than with old, refaced electrodes. Such a linear increase is advantageous in that it allows for welders to more predictably and with greater control increase their current steppers on their welding machines to track the optimal current schedule for the inventive electrode. Accordingly, electrode life is extended, resulting in cost savings. Particularly, such profile is used with the electrode structure of the present invention previously described. This unique combination affords welding operators significant advantages over the prior art. To take advantage of this substantially linear welding process, the operator provides a pair of electrodes, at least one according to the present invention and previously described on a known welding machine in the ordinary manner, such electrode preferably being made of a conventional copper alloy. The operator welds a series of weld joints by pressing the weld joints between a pair of resistance welding electrodes according to the present invention and passing current through the electrodes and through the weld joint according to a particular weld schedule. For the tests set forth above, this weld schedule for an initial 50 welds is established as a threshold current, between about 11,000 and 12,500 amps in the present embodiment, successively pressing the welding joint between the electrodes and passing such current therethrough for each weld. This threshold may vary according to variables such as the type of metal being welded, the presence and type of coatings on the metal, the specified nugget size and strength, and other such factors. However, in establishing the threshold current between an upper and a lower current, the upper amperage is defined as an amperage which is high enough to cause expulsion at the weld. The lower amperage is defined as an amperage which is too low to provide sufficient heat to form a weld of the specified nugget size or strength. As illustrated in FIG. 6 with test 16, the threshold current is established with the 50th weld at 11,000 amps for the illustrated threshold between 11,000 and 12,500 amps. Never-the-less, it is to be understood that envelope 600 and envelope 700 are merely examples suitable to encompass most of the tests illustrated herein, but each may be greater or lesser current values according to the definition for establishing a threshold current provided above. Thus, Test 16 does not fall within the range between envelopes 600 and 700 as illustrated while still being within the scope of the present invention.

For the next welds, weld no. 51 through weld no. 1500, the current is successively stepped up, or increased at a stepper increase rate between about 200 and 250 amps per 100 welds as shown by upper envelope 600 and lower envelope 700 in FIGS. 5 and 6. Thereafter, welding continues until the electrodes fail. Accordingly, substantially linear increase in amperage is provided with the present invention process, providing benefits previously described. Typically, the metal welded is double-sided or single-sided zinc-coated, or galvanized steel such as hot dip, galvanealed, electrogalvanized, pure zinc, zinc-nickel, zinc-nickel under a thin organic coating, hot dip galvanealed, zincroplex, hot dip galvanized or Zincrometal, common to the automotive industry. Other coating on the steel may be used, such as for example tin, lead, terne plate, chromium, organic coatings, cadmium, and/or aluminum coatings may be used. Likewise, other metals may be welded such as titanium, nickel alloys, or other metals. Various combinations of coated and uncoated metals may be welded.

The inventive process may also include the steps of pressing the metal members together between a pair of resistance welding electrodes; and passing an electric current through the electrodes and through the metal members to weld the members together, where at least one of the electrodes comprises a resistance welding electrodes according to the present invention. At least one electrode, and possibly both electrodes are in contact with a zinc-coated or galvanized surface.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A process for fabricating a resistance welding electrode, comprising:

mounting an electrically conductive metal blank having a front end and an opposite rear end in a holder, said blank having a base axis running centrally therethrough between said front end and said rear end, said holder having a major axis, wherein said blank is mounted in said holder so that said base axis and said major axis are oriented with respect to each other at a mounting angle less than 180° so that said base axis and said major axis are nonparallel;

engaging a cutting tool with said blank for cutting a nose portion from said front end of said blank; and spinning said blank and said cutting tool with respect to each other about said major axis to cut said front end of said blank to form said nose portion having a nose axis which coincides with said major axis, wherein said base axis and said nose axis are oriented with respect to each other at a nose angle less than 180° so that said base axis and said nose axis are nonparallel, said nose portion being tapered down to a welding tip face, wherein said spinning step to cut said blank includes the step of cutting said nose portion into a concave profile taper.

2. The process of claim 1 and further comprising the preliminary step of cold forming said blank into a generally cylindrical shape with a longitudinal cooling recess formed in said rear end of said blank.

3. The process of claim 2 wherein said spinning step to cut said blank includes the step of spinning said holder about said major axis with said rear end of said blank revolving around said major axis.

4. The process of claim 3 and further comprising the step of forming said welding tip face to have a convex curvature defining a crown height of about 0.002 inches.

5. The process of claim 4 wherein said nose portion is made of dispersion strengthened copper having co-axial, anisotropic fibrous grain structure at said welding tip face which is oriented at an angular, non-normal angle with respect to said welding tip face to resist cracking.

6. The process of claim 4 wherein said nose portion is made of a copper material consisting of essentially pure copper or of copper combined with one or more metals selected from the group consisting of chromium, zirconium, cadmium, cobalt, nickel, beryllium, tungsten, aluminum, tungsten carbide, iron, and molybdenum.

7. The process of claim 2 wherein said welding tip face has a face diameter, and wherein said nose portion has an axial nose length along said nose axis, said face diameter being about equal to said nose length.

8. The process of claim 2 wherein said concave profile taper of said nose portion defines a frustum of a vortical surface, and wherein said concave profile taper has a concave curvature of an arc of a circle.

9. The process of claim 1 wherein said nose portion is made of dispersion strengthened copper having co-axial, anisotropic fibrous grain structure at said welding tip face which is oriented at an angular, non-normal angle with respect to said welding tip face to resist cracking.

10. The process of claim 1 wherein said spinning step to cut said blank includes the step of spinning said holder about said major axis with said rear end of said blank revolving around said major axis.

11. The process of claim 1 and further comprising the step of forming said welding tip face to have a convex curvature defining a crown height.

12. The process of claim 1 wherein said nose portion is made of a copper material consisting of essentially pure copper or of copper combined with one or more metals selected from the group consisting of chromium, zirconium, cadmium, cobalt, nickel, beryllium, tungsten, aluminum, tungsten carbide, iron, and molybdenum.

13. A resistance welding electrode, comprising:
an electrically conductive base portion defining a central base axis longitudinally therethrough; and
an electrically conductive nose portion projecting from said base portion an axial nose length and terminating in a welding tip face, wherein said nose portion tapers inwardly between said base portion and said welding tip face with a concave profile taper, said nose portion defining a nose axis therethrough, said nose axis being generally normal to said welding tip face; and
wherein said base axis and said nose axis are oriented with respect to each other at a nose angle less than 180° so that said base axis and said nose axis are nonparallel.

14. The electrode of claim 13 wherein said welding tip face is fabricated to define a slight convex welding tip curvature.

15. The electrode of claim 14 wherein said welding tip face has a face diameter about equal to said nose length.

16. The electrode of claim 15 wherein said concave profile taper of said nose portion defines a frustum of a vortical surface, and wherein said concave profile taper has a concave curvature of an arc of a circle.

17. The electrode of claim 16 wherein said slight convex curvature defines a crown height of about 0.002 inches.

18. The electrode of claim 14 wherein said nose portion is made of dispersion strengthened copper having co-axial, anisotropic fibrous grain structure at said welding tip face which is oriented at an angular, non-normal angle with respect to said welding tip face to resist cracking.

19. The electrode of claim 14 wherein said slight convex curvature defines a crown height of about 0.002 inches.

20. The electrode of claim 13 wherein said welding tip face has a face diameter about equal to said nose length.

21. The electrode of claim 13 wherein said concave profile taper of said nose portion defines a frustum of a vortical surface, and wherein said concave profile taper has a concave curvature of an arc of a circle.

22. The electrode of claim 13 wherein said nose portion and said base define a shoulder therebetween, and wherein said welding tip face has a circular shape and said shoulder has an elliptical shape when viewed from a frontal perspective looking along said nose axis.

23. The electrode of claim 13 wherein said nose portion is made of a copper material consisting of essentially pure copper or of copper combined with one or more metals selected from the group consisting of chromium, zirconium, cadmium, cobalt, nickel, beryllium, tungsten, aluminum, tungsten carbide, iron, and molybdenum.

24. The electrode of claim 13 wherein said concave profile is defined by a plurality of incremental linear segments.

25. The electrode of claim 13 wherein said nose portion has co-axial, anisotropic fibrous grain structure at said welding tip face which is oriented at an angular, non-normal angle with respect to said welding tip face to resist cracking.

* * * * *